United States Patent
Zhao

(10) Patent No.: US 8,190,153 B2
(45) Date of Patent: May 29, 2012

(54) APPARATUS AND METHODS FOR PROVIDING POWER SAVINGS ON MOBILE DEVICES

(75) Inventor: Wen Zhao, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 369 days.

(21) Appl. No.: 12/642,417

(22) Filed: Dec. 18, 2009

(65) Prior Publication Data

US 2011/0151866 A1 Jun. 23, 2011

(51) Int. Cl.
| | |
|---|---|
| H04W 4/00 | (2009.01) |
| H04W 24/00 | (2009.01) |
| H04W 36/00 | (2009.01) |
| H04M 1/00 | (2006.01) |
| H04B 1/38 | (2006.01) |
| G01S 19/38 | (2010.01) |

(52) U.S. Cl. .......... 455/434; 455/556.1; 455/456.4; 455/574; 455/441; 455/436; 342/357.21

(58) Field of Classification Search .......... 455/434, 455/556.1
See application file for complete search history.

(56) References Cited

U.S. PATENT DOCUMENTS

| | | | |
|---|---|---|---|
| 2009/0289845 A1* | 11/2009 | Gum | 342/357.12 |
| 2010/0304754 A1* | 12/2010 | Czompo et al. | 455/456.1 |
| 2010/0304761 A1* | 12/2010 | Seibert et al. | 455/456.4 |

* cited by examiner

*Primary Examiner* — Dwayne Bost
*Assistant Examiner* — Timothy Pham

(57) ABSTRACT

Various embodiments for providing enhanced power savings in mobile computing devices are described. In one or more embodiments, a mobile computing device may include a motion sensor to detect when the device is in motion. The mobile computing device may include a radio processor that may select from among several signal search procedures based on whether the device is in motion, and whether a signal is detectable and adequate. Other embodiments are described and claimed.

18 Claims, 4 Drawing Sheets

APPARATUS AND METHODS FOR PROVIDING POWER SAVINGS ON MOBILE DEVICES

BACKGROUND

A mobile computing device such as a combination handheld computer and mobile telephone or smart phone generally may provide voice and data communication functionality, as well as computing and processing capabilities. In order to provide communication functionality, the device may need to search for and maintain wireless signal connections. Searching for wireless signals may consume battery power. Accordingly, there may be a need for an improved apparatus and methods for providing enhanced power savings while maintaining communication services.

DETAILED DESCRIPTION

Various embodiments are directed to providing enhanced power savings on mobile devices, in particular, battery power savings. In one or more embodiments, a mobile computing device may include a motion sensor. The mobile computing device may search for and maintain wireless connections differently depending on whether the device is in motion or stationary.

Figure 1:
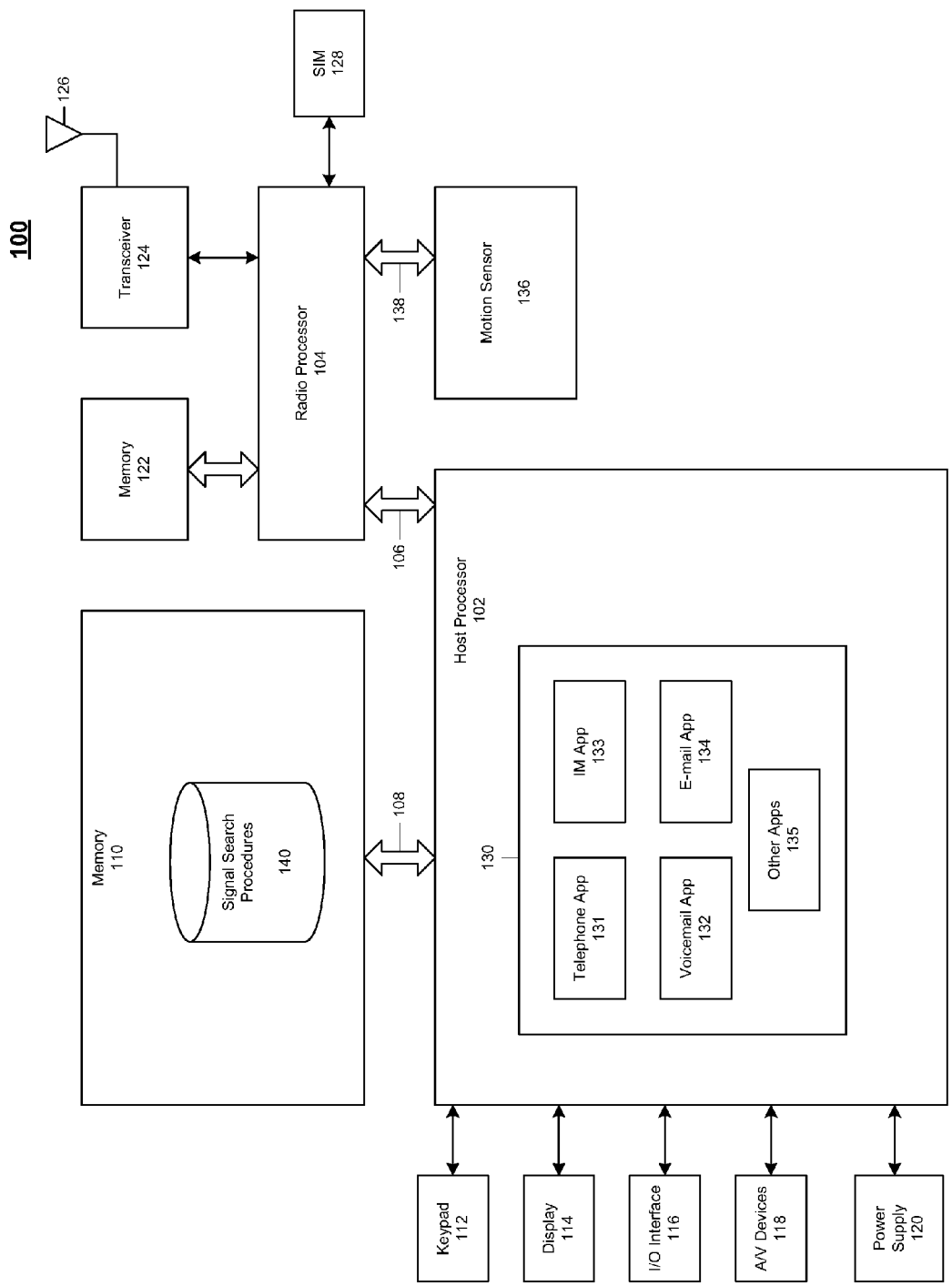
FIG. 1 illustrates a mobile computing device in accordance with one or more embodiments.

FIG. 1 illustrates a mobile computing device 100 in accordance with one or more embodiments. The mobile computing device 100 may be implemented as a combination handheld computer and mobile telephone, sometimes referred to as a smart phone. Examples of smart phones include, but are not limited to, for example, Palm® products such as Palm® Treo™ and Palm® Pre™ smart phones. Although some embodiments may be described with the mobile computing device 100 implemented as a smart phone by way of example, it may be appreciated that the embodiments are not limited in this context. For example, the mobile computing device 100 may comprise, or be implemented as, any type of wireless device, mobile station, or portable computing device with a self-contained power source (e.g., battery) such as a laptop computer, ultra-laptop computer, personal digital assistant (PDA), cellular telephone, combination cellular telephone/PDA, mobile unit, subscriber station, user terminal, portable computer, handheld computer, palmtop computer, wearable computer, media player, pager, messaging device, data communication device, and so forth.

The mobile computing device 100 may provide voice communications functionality in accordance with different types of cellular radiotelephone systems. Examples of cellular radiotelephone systems may include Code Division Multiple Access (CDMA) systems, Global System for Mobile Communications (GSM) systems, North American Digital Cellular (NADC) systems, Time Division Multiple Access (TDMA) systems, Extended-TDMA (E-TDMA) systems, Narrowband Advanced Mobile Phone Service (NAMPS) systems, third generation (3G) systems such as Wide-band CDMA (WCDMA), CDMA-2000, Universal Mobile Telephone System (UMTS) systems, and so forth.

In addition to voice communications functionality, the mobile computing device 100 may be arranged to provide data communications functionality in accordance with different types of cellular radiotelephone systems. Examples of cellular radiotelephone systems offering data communications services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, High Speed Uplink Packet Access (HSUPA), and so forth.

The mobile computing device 100 may be arranged to provide voice and/or data communications functionality in accordance with different types of wireless network systems. Examples of wireless network systems may include a wireless local area network (WLAN) system, wireless metropolitan area network (WMAN) system, wireless wide area network (WWAN) system, and so forth. Examples of suitable wireless network systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and so forth.

The mobile computing device 100 may be arranged to perform data communications in accordance with different types of shorter range wireless systems, such as a wireless personal area network (PAN) system. One example of a suitable wireless PAN system offering data communication services may include a Bluetooth system operating in accordance with the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Other examples may include systems using infrared techniques or near-field communication techniques and protocols, such as electro-magnetic induction (EMI) techniques. An example of EMI techniques may include passive or active radio-frequency identification (RFID) protocols and devices.

As shown in the embodiment of FIG. 1, the mobile computing device 100 may comprise a dual or multi-processor architecture including a host processor 102 and a radio processor 104. In various implementations, the host processor 102 and the radio processor 104 may be arranged to communicate with each other using interfaces 106 such as one or more universal serial bus (USB) interfaces, micro-USB interfaces, universal asynchronous receiver-transmitter (UART) interfaces, general purpose input/output (GPIO) interfaces, control/status lines, control/data lines, audio lines, and so forth.

The host processor 102 may be responsible for executing various software programs such as system programs and applications programs to provide computing and processing operations for the mobile computing device 100. The radio processor 104 may be responsible for performing various voice and data communications operations for the mobile computing device 100 such as transmitting and receiving voice and data information over one or more wireless communications channels. Although some embodiments may be described as comprising a dual processor architecture for purposes of illustration, it is worthy to note that the mobile computing device 100 may comprise any suitable processor architecture and/or any suitable number of processors consistent with the described embodiments.

The host processor 102 may be implemented as a host central processing unit (CPU) using any suitable processor or logic device, such as a as a general purpose processor. Although some embodiments may be described with the host processor 102 implemented as a CPU or general purpose processor by way of example, it may be appreciated that the embodiments are not limited in this context. For example, the host processor 102 may comprise, or be implemented as, a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the host processor 102 may be coupled through a memory bus 108 to a memory 110. The memory bus 108 may comprise any suitable interface and/or bus architecture for allowing the host processor 102 to access the memory 110. Although the memory 110 may be shown as being separate from the host processor 102 for purposes of illustration, it is worthy to note that in various embodiments some portion or the entire memory 110 may be included on the same integrated circuit as the host processor 102. Alternatively, some portion or the entire memory 110 may be disposed on an integrated circuit or other medium (e.g., hard disk drive) external to the integrated circuit of host processor 102. In various embodiments, the mobile computing device 100 may comprise an expansion slot to support a multimedia and/or memory card, for example.

The memory 110 may be implemented using any machine-readable or computer-readable media capable of storing data such as volatile memory or non-volatile memory, removable or non-removable memory, erasable or non-erasable memory, writeable or re-writeable memory, and so forth. Examples of machine-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The mobile computing device 100 may comprise an alphanumeric keypad 112 coupled to the host processor 102. The keypad 112 may comprise, for example, a QWERTY key layout and an integrated number dial pad. The mobile computing device 100 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, and so forth.

The mobile computing device 100 may comprise a display 114 coupled to the host processor 102. The display 114 may comprise any suitable visual interface for displaying content to a user of the mobile computing device 100. In one embodiment, for example, the display 114 may be implemented by a liquid crystal display (LCD) such as a touch-sensitive color (e.g., 16-bit color) thin-film transistor (TFT) LCD screen. In some embodiments, the touch-sensitive LCD may be used with a stylus and/or a handwriting recognizer program.

The mobile computing device 100 may comprise an input/output (I/O) interface 116 coupled to the host processor 102. The I/O interface 116 may comprise one or more I/O devices such as a serial connection port, an infrared port, integrated Bluetooth® wireless capability, and/or integrated 802.11x (WiFi) wireless capability, to enable wired (e.g., USB cable) and/or wireless connection to a local computer system, such as a local personal computer (PC). In various implementations, mobile computing device 100 may be arranged to transfer and/or synchronize information with the local computer system.

The host processor 102 may be coupled to various audio/video (A/V) devices 118 that support A/V capability of the mobile computing device 100. Examples of A/V devices 118 may include, for example, a microphone, one or more speakers, an audio port to connect an audio headset, an audio coder/decoder (codec), an audio player, a digital camera, a video camera, a video codec, a video player, and so forth.

The host processor 102 may be coupled to a power supply 120 arranged to supply and manage power to the elements of the mobile computing device 100. In various embodiments, the power supply 120 may be implemented by a rechargeable battery, such as a removable and rechargeable lithium ion battery to provide direct current (DC) power, and/or an alternating current (AC) adapter to draw power from a standard AC main power supply.

As mentioned above, the radio processor 104 may perform voice and/or data communication operations for the mobile computing device 100. For example, the radio processor 104 may be arranged to communicate voice information and/or data information over one or more assigned frequency bands of a wireless communication channel. In various embodiments, the radio processor 104 may be implemented as a communications processor using any suitable processor or logic device, such as a modem processor or baseband processor. Although some embodiments may be described with the radio processor 104 implemented as a modem processor or baseband processor by way of example, it may be appreciated that the embodiments are not limited in this context. For example, the radio processor 104 may comprise, or be implemented as, a digital signal processor (DSP), media access control (MAC) processor, or any other type of communications processor in accordance with the described embodiments.

In various embodiments, the radio processor 104 may perform analog and/or digital baseband operations for the mobile computing device 100. For example, the radio processor 104 may perform digital-to-analog conversion (DAC), analog-to-digital conversion (ADC), modulation, demodulation, encoding, decoding, encryption, decryption, and so forth.

The mobile computing device 100 may comprise a memory 122 coupled to the radio processor 104. The memory 122 may be implemented using one or more types of machine-readable or computer-readable media capable of storing data such as volatile memory or non-volatile memory, removable or non-removable memory, erasable or non-erasable memory, writeable or re-writeable memory, and so forth. The memory 122 may comprise, for example, flash memory and secure digital (SD) RAM. Although the memory 122 may be shown as being separate from and external to the radio processor 104 for purposes of illustration, it is worthy to note that in various embodiments some portion or the entire memory 122 may be included on the same integrated circuit as the radio processor 104.

The mobile computing device 100 may comprise a transceiver module 124 coupled to the radio processor 104. The transceiver module 124 may comprise one or more transceivers arranged to communicate using different types of protocols, communication ranges, operating power requirements, RF sub-bands, information types (e.g., voice or data), use scenarios, applications, and so forth. In various embodiments, the transceiver module 124 may comprise one or more transceivers arranged to support voice communication for a cellular radiotelephone system such as a GSM, UMTS, and/or CDMA system. The transceiver module 124 also may comprise one or more transceivers arranged to perform data communications in accordance with one or more wireless communications protocols such as WWAN protocols (e.g., GSM/GPRS protocols, CDMA/1xRTT protocols, EDGE protocols, EV-DO protocols, EV-DV protocols, HSDPA protocols, etc.), WLAN protocols (e.g., IEEE 802.11a/b/g/n, IEEE 802.16, IEEE 802.20, etc.), PAN protocols, Infrared protocols, Bluetooth protocols, EMI protocols including passive or active RFID protocols, and so forth. In some embodiments, the transceiver module 124 may comprise a Global Positioning System (GPS) transceiver to support position determination and/or location-based services.

The transceiver module 124 generally may be implemented using one or more chips as desired for a given implementation. Although the transceiver module 124 may be shown as being separate from and external to the radio processor 104 for purposes of illustration, it is worthy to note that in various embodiments some portion or the entire transceiver module 124 may be included on the same integrated circuit as the radio processor 104. The embodiments are not limited in this context.

The mobile computing device 100 may comprise an antenna system 126 for transmitting and/or receiving electrical signals. As shown, the antenna system 126 may be coupled to the radio processor 104 through the transceiver module 124. The antenna system 126 may comprise or be implemented as one or more internal antennas and/or external antennas.

The mobile computing device 100 may comprise a subscriber identity module (SIM) 128 coupled to the radio processor 104. The SIM 128 may comprise, for example, a removable or non-removable smart card arranged to encrypt voice and data transmissions and to store user-specific data for allowing a voice or data communications network to identify and authenticate the user. The SIM 128 also may store data such as personal settings specific to the user.

The mobile computing device 100 may comprise a motion sensor 136 in communication with radio processor 104 over bus 138. Motion sensor 136 may comprise, for example, one or more accelerometers, such as, but not limited to, a microelectrical mechanical systems (MEMS) based accelerometer, a two-axis accelerometer, or a three-axis accelerometer. In an embodiment, motion sensor 136 may detect motion without the use of cellular or radio signals, which may be unavailable. Motion sensor 136 may detect when the mobile computing device 100 is in motion, such as when the device operator is walking, or riding in a vehicle. Motion sensor 136 may inform radio processor 104 when it detects motion. Radio processor 104 may select a first signal search and/or maintenance procedure when the device is in motion, and a second signal search and/or maintenance procedure when the device is stationary. The embodiments are not limited to these examples.

As mentioned above, the host processor 102 may be arranged to provide processing or computing resources to the mobile computing device 100. For example, the host processor 102 may be responsible for executing various software programs such as system programs and application programs to provide computing and processing operations for the mobile computing device 100.

System programs generally may assist in the running of the mobile computing device 100 and may be directly responsible for controlling, integrating, and managing the individual hardware components of the computer system. Examples of system programs may include, without limitation, an operating system (OS), device drivers, programming tools, utility programs, software libraries, application programming interfaces (APIs), and so forth. The mobile computing device 100 may utilize any suitable OS in accordance with the described embodiments such as a Palm OS®, Palm OS® Cobalt, Palm® webOS™, Microsoft® Windows OS, Microsoft Windows® CE, Microsoft Pocket PC, Microsoft Mobile, Symbian OS™, Embedix OS, Linux, Binary Run-time Environment for Wireless (BREW) OS, JavaOS, a Wireless Application Protocol (WAP) OS, and so forth.

As shown in FIG. 1, the mobile computing device 100 may comprise or implement several applications 130. The applications 130 may comprise, for example, a telephone application 131 such as a cellular telephone application, a Voice over Internet Protocol (VoIP) application, a Push-to-Talk (PTT) application, and so forth. The applications 130 may further comprise a voicemail application 132, an instant messaging application 133, an e-mail application 134, and other applications 135. Applications 130 generally may allow a user to accomplish one or more specific tasks. Examples of other applications 135 may include, without limitation, one or more messaging applications (e.g., telephone, voicemail, facsimile, e-mail, IM, SMS, MMS, video conferencing), a web browser application, personal information management (PIM) applications (e.g., contacts, calendar, scheduling, tasks), word processing applications, spreadsheet applications, database applications, media applications (e.g., video player, audio player, multimedia player, digital camera, video camera, media management), gaming applications, and so forth. In various implementations, the application programs may provide one or more graphical user interfaces (GUIs) to communicate information between the mobile computing device 100 and a user. In some embodiments, application programs may comprise upper layer programs running on top of the OS of the host processor 102 that operate in conjunction with the functions and protocols of lower layers including, for example, a transport layer such as a Transmission Control Protocol (TCP) layer, a network layer such as an Internet Protocol (IP) layer, and a link layer such as a Point-to-Point (PPP) layer used to translate and format data for communication.

The mobile computing device 100 may comprise signal search procedures 140, which may be stored, for example, in memory 110 or in memory 122. Signal search procedures 140 may comprise different algorithms for searching for and maintaining radio and wireless signals. Different algorithms may apply when the device is stationary and when it is in motion. The algorithms may alter the behavior of the radio processor 104 in order to conserve battery power.

Figure 2:
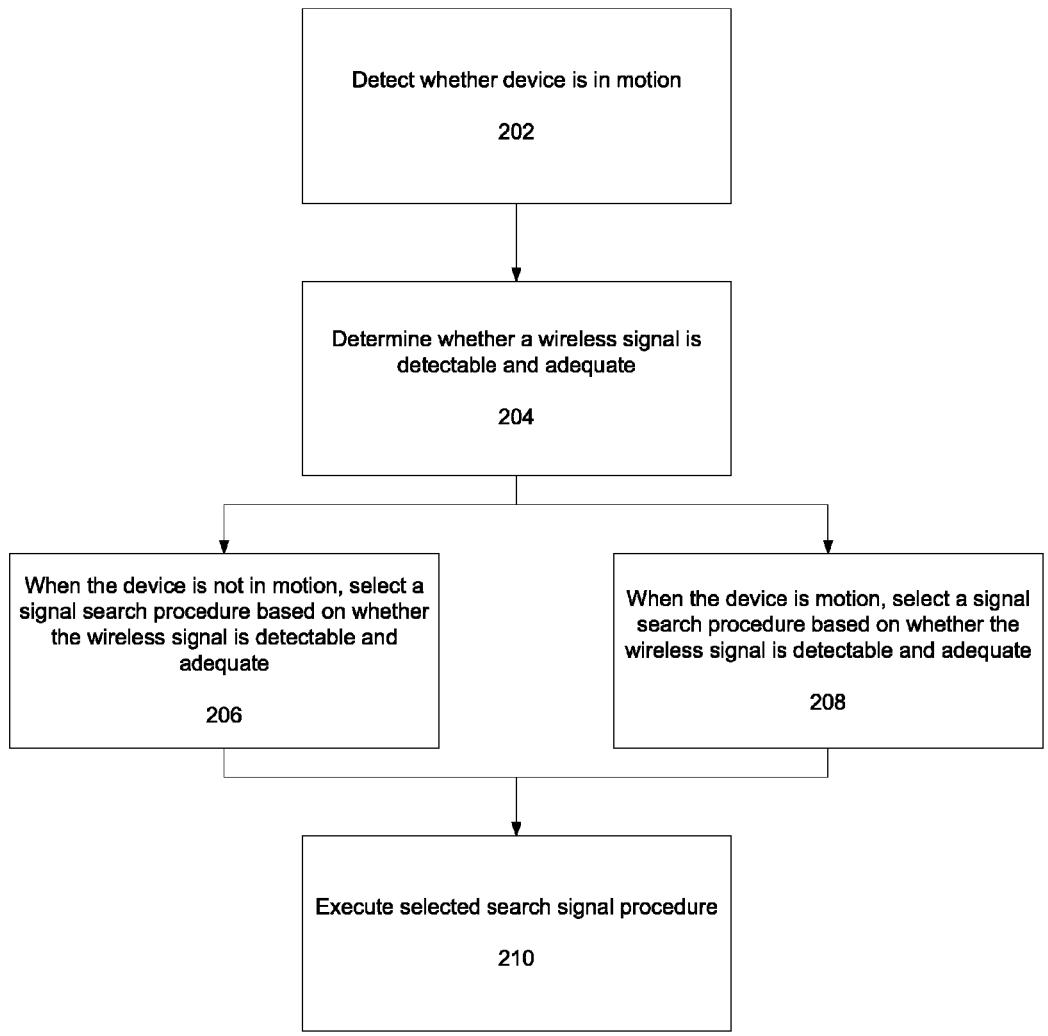
FIG. 2 illustrates a logic flow in accordance with one or more embodiments.

FIG. 2 illustrates a logic flow 200 in accordance with one or more embodiments. Logic flow 200 may be representative of the operations executed by one or more embodiments described herein, such as by mobile computing device 100, with radio processor 104. As shown in logic flow 200, in block 202, mobile computing device 100 may determine whether it is in motion, using motion sensor 136.

In block 204, radio processor 104 may determine whether a wireless signal is detectable, and if so, whether the detected wireless signal is adequate. The adequacy of a wireless signal may be determined by various metrics, for example, by a signal strength or reliability measure being higher than some defined threshold. In an embodiment, the adequacy of multiple wireless signals may be determined.

In block 206, when the device is not in motion, radio processor 206 may select from among several signal search procedures according to whether the wireless signal is detectable and/or adequate.

In block 208, when the device is in motion, radio processor 206 may select from among several other signal search procedures according to whether the wireless signal is detectable and/or adequate.

In block 210, radio processor 104 may execute the selected signal search procedure.

Figure 3:
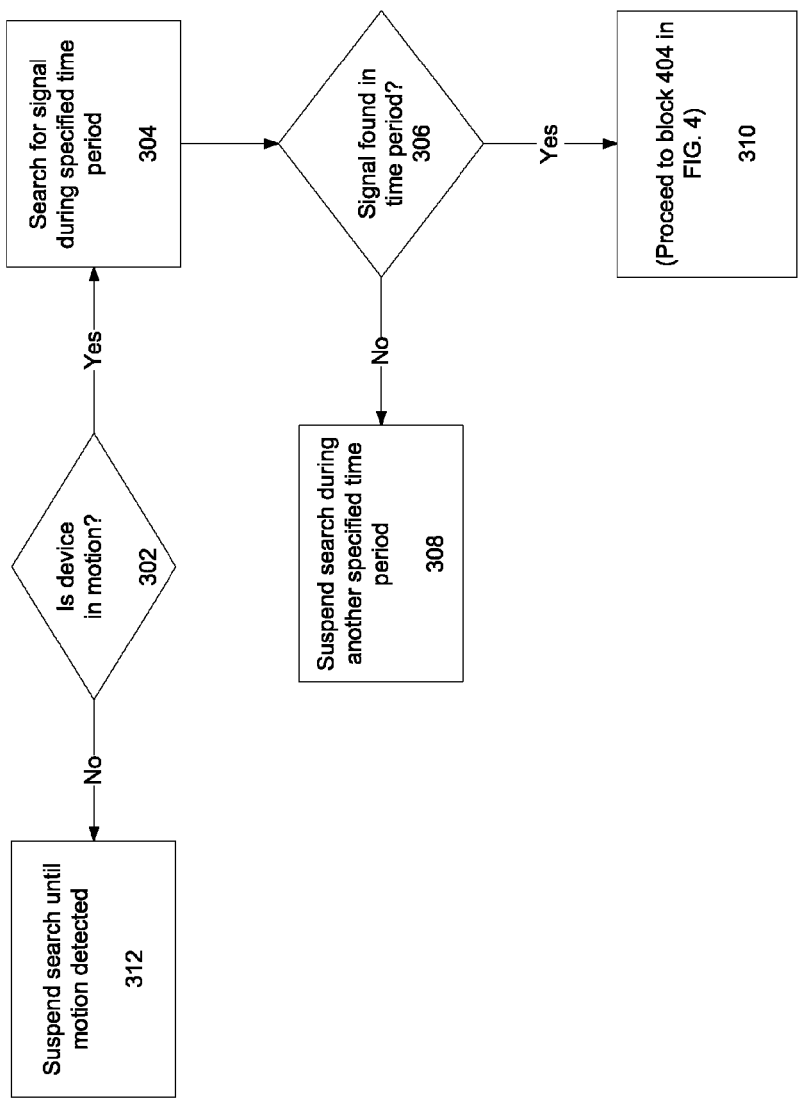
FIG. 3 illustrates a logic flow in accordance with one or more embodiments.

FIG. 3 illustrates a logic flow 300 of one or more signal search procedures in accordance with one or more embodiments. Logic flow 300 may apply when there is no detectable signal for at least one of the wireless communication functions on mobile computing device 100. For example, radio processor 104 may follow logic flow 300 when there is no detectable cellular radio telephone signal.

In block 302, radio processor 104 determines whether the mobile computing device 100 is in motion. In an embodiment, radio processor 104 may poll motion sensor 136. In other embodiments, motion sensor 136 may set a flag when motion is detected and may change the flag when motion is no longer detected, or may transmit periodic motion status indications to radio processor 104.

If the device is in motion, in block 304, radio processor 104 may search for a signal for a specified time period. In an embodiment, radio processor 104 may search in its current location, and also in neighboring cells. In an embodiment, radio processor 104 may use a UOOS or OOS back off algorithm.

In block 306, if no signal is found in the specified time period, radio processor 104 may suspend searching for the signal for another specified time period (block 308).

Figure 4:
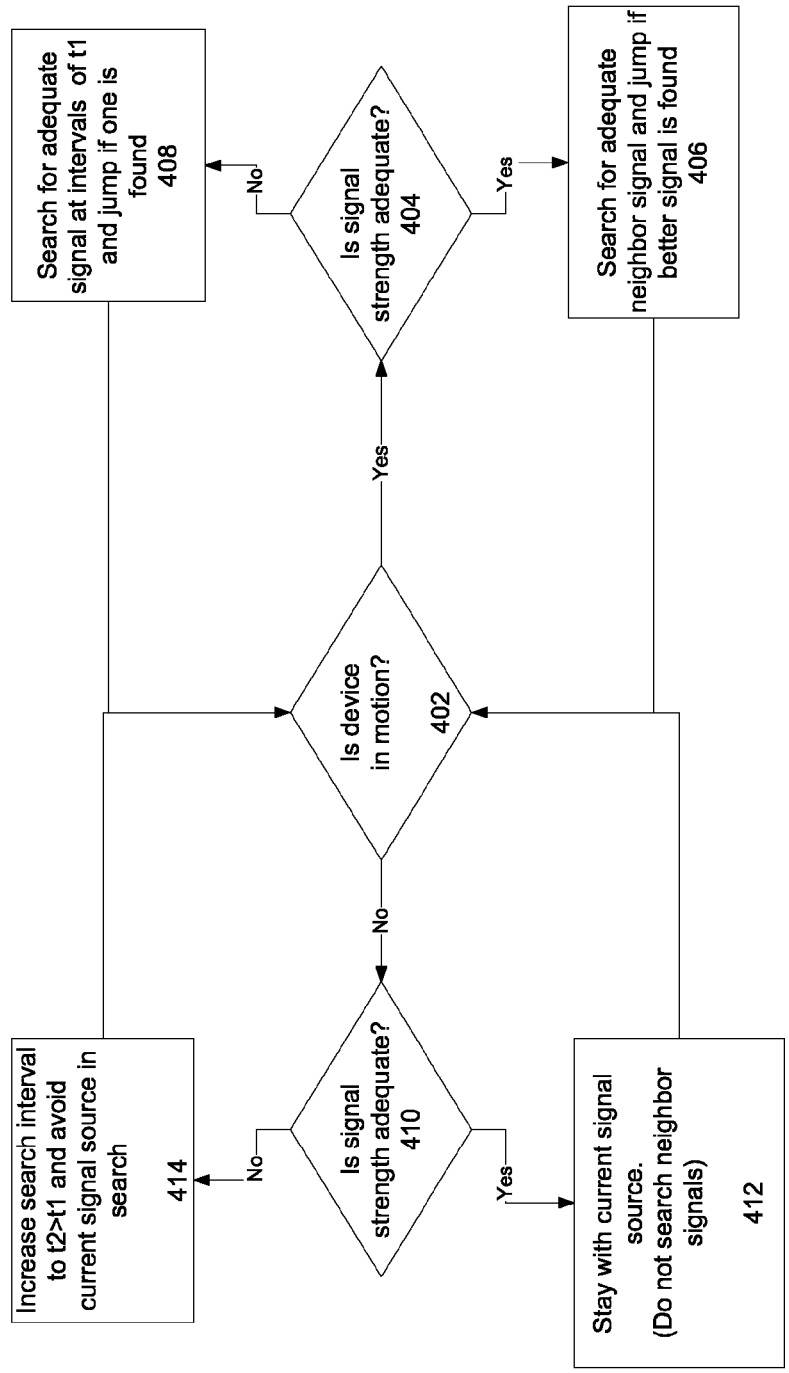
FIG. 4 illustrates a logic flow in accordance with one or more embodiments.

In block 306, if a signal is found in the specified time period, radio processor 104 may proceed to block 404 in FIG. 4 (block 310).

If the device is not in motion at block 304, then the radio processor 104 may stop searching for a signal until motion is detected (block 312).

Logic flow 300 may be applied on a signal-by-signal basis. For example, if a short range wireless network, e.g. Blue-Tooth, signal is sufficient, but the larger wireless network system signal, e.g. a WLAN, is not detectable, logic flow 300 may only apply to the larger wireless network system signal search.

FIG. 4 illustrates a logic flow 400 of one or more signal search procedures in accordance with one or more embodiments. Logic flow 400 may apply when there is a detectable signal for at least one of the wireless communication functions on mobile computing device 100. For example, radio processor 104 may follow logic flow 400 when there is a detectable wireless network signal.

In block 402, radio processor 104 determines whether the mobile computing device 100 is in motion, as described above regarding block 202 in FIG. 2.

In block 404, radio processor 104 may determine whether the signal strength is adequate. Signal strength adequacy may be measured, for example, by comparing the strength to some threshold.

If the signal strength is adequate, then in block 406, radio processor 104 may maintain the current connection while searching neighboring signals. If a better signal is found, then radio processor 104 may "jump" to that better signal.

If the signal strength is not adequate, then in block 408 radio processor 104 may search for a better signal periodically at time intervals of t1. If a better signal is found, then radio processor 104 may "jump" to that better signal. Block 408 may be repeated for as long as the device is in motion.

If, at block 402, the device is not in motion, radio processor 104 may determine in block 410 whether the signal strength is adequate, as in block 404.

If the signal strength is adequate at block 410, then radio processor 104 may stay with the current signal source at block 412. In this situation, conventional mobile computing devices may search neighboring signals for a better signal or in preparation for a handoff, which consumes battery power.

If, at block 410, the signal strength is not adequate, radio processor 104 may search for an adequate signal, as in block 408, but using a long interval $t2 > t1$ between searches (block 414). Further, radio processor 104 may avoid the current, poor, signal source in the search, for some longer time interval, for example, 10 minutes.

As for logic flow 200, logic flow 400 may be applied on a signal-by-signal basis.

Numerous specific details have been set forth to provide a thorough understanding of the embodiments. It will be understood, however, that the embodiments may be practiced without these specific details. In other instances, well-known operations, components and circuits have not been described in detail so as not to obscure the embodiments. It can be appreciated that the specific structural and functional details are representative and do not necessarily limit the scope of the embodiments.

Various embodiments may comprise one or more elements. An element may comprise any structure arranged to perform certain operations. Each element may be implemented as hardware, software, or any combination thereof, as desired for a given set of design and/or performance constraints. Although an embodiment may be described with a limited number of elements in a certain topology by way of example, the embodiment may include more or less elements in alternate topologies as desired for a given implementation.

It is worthy to note that any reference to "one embodiment" or "an embodiment" means that a particular feature, structure, or characteristic described in connection with the embodiment is included in at least one embodiment. The appearances of the phrase "in one embodiment" in the specification are not necessarily all referring to the same embodiment.

Although some embodiments may be illustrated and described as comprising exemplary functional components or modules performing various operations, it can be appreciated that such components or modules may be implemented by one or more hardware components, software components, and/or combination thereof. The functional components and/or modules may be implemented, for example, by logic (e.g., instructions, data, and/or code) to be executed by a logic device (e.g., processor). Such logic may be stored internally or externally to a logic device on one or more types of computer-readable storage media.

It also is to be appreciated that the described embodiments illustrate exemplary implementations, and that the functional components and/or modules may be implemented in various other ways which are consistent with the described embodiments. Furthermore, the operations performed by such components or modules may be combined and/or separated for a given implementation and may be performed by a greater number or fewer number of components or modules.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers or other such information storage, transmission or display devices.

It is worthy to note that some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. With respect to software elements, for example, the term "coupled" may refer to interfaces, message interfaces, API, exchanging messages, and so forth.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a processor, or any combination thereof.

While certain features of the embodiments have been illustrated as described above, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus comprising:
a motion sensor to detect when the apparatus is in motion; and
a radio processor, coupled to the motion sensor, to connect to at least one wireless signal using a first signal search procedure when the apparatus is in motion and a second signal search procedure when the apparatus is not in motion,
wherein when the apparatus is not in motion and a wireless signal strength is detectable, the second signal search procedure performed by the radio processor comprises:
determining whether the wireless signal is adequate;
when the wireless signal is adequate, maintaining a connection to a current signal source without searching for neighboring signal sources; and
when the wireless signal is not adequate, increasing a search interval time between searches for an adequate signal, and avoiding a current signal source in the search for an adequate signal.

2. The apparatus of claim 1, wherein the first signal search procedure comprises:
a $3^{rd}$ signal search procedure for when there is no detectable wireless signal; and
a $4^{th}$ signal search procedure for when there is a detectable wireless signal.

3. The apparatus of claim 2, wherein the radio processor is to connect to a plurality of wireless signals, and wherein a signal search procedure for a wireless signal is determined on a per signal basis.

4. The apparatus of claim 1, wherein the second signal search procedure comprises:
a $5^{th}$ signal search procedure for when there is no detectable signal; and
a $6^{th}$ signal search procedure for when there is a detectable signal.

5. The apparatus of claim 4, wherein the radio processor is to connect to a plurality of wireless signals, and wherein a signal search procedure for a wireless signal is determined on a per signal basis.

6. The apparatus of claim 1, wherein the motion sensor comprises an accelerometer.

7. The apparatus of claim 1, wherein a wireless signal comprises at least one of: a cellular radiotelephone signal, a wireless network system signal, a shorter range wireless network signal, or a global positioning system signal.

8. A method operating on a wireless computing device, the method comprising:
detecting whether the device is in motion;
detecting whether a wireless signal has adequate strength at the device;
when the device is not in motion, selecting from a first signal search procedure and a second signal search procedure according to the wireless signal strength; and
when the device is in motion, selecting from a third signal search procedure and a fourth signal search procedure according to the wireless signal strength,
wherein when the device is not in motion and the wireless signal strength is detectable, the first signal search procedure comprises:
determining whether the wireless signal is adequate;
when the wireless signal is adequate, maintaining a connection to a current signal source without searching for neighboring signal sources; and
when the wireless signal is not adequate, increasing a search interval time between searches for an adequate signal, and avoiding a current signal source in the search for an adequate signal.

9. The method of claim 8, wherein when the device is not in motion and the wireless signal strength is not detectable, the second signal search procedure comprises:
suspending searching for a detectable signal until motion is detected.

10. The method of claim 8, wherein when the device is in motion and the wireless signal strength is detectable, the third signal search procedure comprises:
determining whether the wireless signal is adequate;
when the wireless signal is adequate, maintaining a connection to a current signal source and searching for a stronger wireless signal from among neighboring signal sources; and
when the wireless signal is not adequate, searching for a stronger wireless signal from among neighboring signal sources at a search interval.

11. The method of claim 8, wherein when the device is in motion and the wireless signal strength is not detectable, the fourth signal search procedure comprises:
searching for a detectable wireless signal from among neighboring signal sources during a specified time period; and if no detectable signal is found during the specified time period, suspending the search during a second specified time period.

12. The method of claim 8, further comprising detecting whether a plurality of wireless signals have adequate strength at the device and selecting from the first, second, third and fourth signal search procedures on a per signal basis.

13. The method of claim 8, wherein a wireless signal comprises at least one of: a cellular radiotelephone signal, a wireless network system signal, a shorter range wireless network signal, or a global positioning system signal.

14. A machine-readable non-transitory storage medium comprising instructions that when executed enable a radio processor within a mobile computing system to:
    select from a first signal search procedure and a second signal search procedure according to a wireless signal strength when the system is not in motion;
    select from a third signal search procedure and a fourth signal search procedure according to a wireless signal strength when the system is in motion; and
    execute the selected signal search procedure,
    wherein when the system is not in motion and the wireless signal strength is detectable, the first signal search procedure comprises instructions that when executed enable the radio processor to:
       determine whether the wireless signal is adequate;
       when the wireless signal is adequate, maintain a connection to a current signal source without searching for neighboring signal sources; and
       when the wireless signal is not adequate, increase a search interval time between searches for an adequate signal, and avoid a current signal source in the search for an adequate signal.

15. The non-transitory storage medium of claim 14, wherein when the device is not in motion and the wireless signal strength is not detectable, the second signal search procedure comprises instructions that when executed enable the mobile computing system to:
    suspend searching for a detectable signal until motion is detected.

16. The non-transitory storage medium of claim 14, wherein when the system is in motion and the wireless signal strength is detectable, the third signal search procedure comprises instructions that when executed enable the mobile computing system to:
    determine whether the wireless signal is adequate;
    when the wireless signal is adequate, maintain a connection to a current signal source and search for a stronger wireless signal from among neighboring signal sources; and
    when the wireless signal is not adequate, search for a stronger wireless signal from among neighboring signal sources at a search interval.

17. The non-transitory storage medium of claim 14, wherein when the device is in motion and the wireless signal strength is not detectable, the fourth signal search procedure comprises instructions that if executed enable the mobile computing system to:
    search for a detectable wireless signal from among neighboring signal sources during a specified time period; and
    if no detectable signal is found during the specified time period, suspend the search during a second specified time period.

18. The non-transitory storage medium of claim 14, further comprising instructions that when executed enable the mobile computing system to detect whether a plurality of wireless signals have adequate strength at the system and to select from the first, second, third and fourth signal search procedures on a per signal basis.

\* \* \* \* \*